US010147330B2

(12) United States Patent
Schwartz et al.

(10) Patent No.: US 10,147,330 B2
(45) Date of Patent: Dec. 4, 2018

(54) AIRCRAFT FLIGHT PATH HOLDING PATTERN SYSTEM AND METHOD

(71) Applicant: THE BOEING COMPANY, Chicago, IL (US)

(72) Inventors: Samantha A. Schwartz, Englewood, CO (US); Garoe Gonzalez Parra, Neu-Isenburg (DE); Adam Karwan, Gdansk (PL); Marcin Zadroga, Gdansk (PL)

(73) Assignee: The Boeing Company, Chicago, IL (US)

( * ) Notice: Subject to any disclaimer, the term of this patent is extended or adjusted under 35 U.S.C. 154(b) by 42 days.

(21) Appl. No.: 15/475,260

(22) Filed: Mar. 31, 2017

(65) Prior Publication Data

US 2018/0286257 A1 Oct. 4, 2018

(51) Int. Cl.

| | |
|---|---|
| ***G06F 19/00*** | (2018.01) |
| ***G06G 7/70*** | (2006.01) |
| ***G06G 7/76*** | (2006.01) |
| ***G08G 5/02*** | (2006.01) |
| ***G08G 5/00*** | (2006.01) |

(52) U.S. Cl.

CPC .......... *G08G 5/025* (2013.01); *G08G 5/0034* (2013.01); *G08G 5/0091* (2013.01)

(58) Field of Classification Search

CPC ..... G08G 5/025; G08G 5/0034; G08G 5/0091

See application file for complete search history.

(56) References Cited

U.S. PATENT DOCUMENTS

| | | | | |
|---|---|---|---|---|
| 5,884,223 | A * | 3/1999 | Tognazzini | G08G 5/0021 340/961 |
| 6,690,296 | B2 * | 2/2004 | Corwin | G01S 13/782 340/945 |
| 7,764,224 | B1 * | 7/2010 | Anderson | G01S 19/215 342/357.27 |
| 9,640,079 | B1 * | 5/2017 | Moravek | G08G 5/0013 |
| 2008/0294304 | A1 * | 11/2008 | Coulmeau | G06Q 10/04 701/3 |
| 2013/0001355 | A1 * | 1/2013 | Cox | B64C 25/405 244/50 |

(Continued)

FOREIGN PATENT DOCUMENTS

| | | |
|---|---|---|
| EP | 2455928 | 5/2012 |
| EP | 2980774 | 2/2016 |

OTHER PUBLICATIONS

U.S. Appl. No. 15/468,194 (unpublished as of Oct. 27, 2017).

(Continued)

*Primary Examiner* — Mussa A Shaawat

(74) *Attorney, Agent, or Firm* — Joseph M. Butscher; The Small Patent Law Group, LLC

(57) ABSTRACT

A flight path holding pattern system is configured to determine an efficient holding pattern for an aircraft. The flight path holding pattern system includes a holding pattern determination unit that is configured to automatically generate the holding pattern for the aircraft based on one or more of current air traffic in relation to a destination airport, historical holding patterns in relation to the destination airport, current weather conditions in relation to the destination airport, and fuel consumption of one or both of the aircraft and at least one other aircraft.

28 Claims, 5 Drawing Sheets

(56) References Cited

U.S. PATENT DOCUMENTS

| | | | | |
|---|---|---|---|---|
| 2016/0057032 | A1* | 2/2016 | Tieftrunk | G01C 21/00 701/533 |
| 2016/0065497 | A1* | 3/2016 | Coulmeau | H04L 47/821 709/203 |
| 2016/0240090 | A1* | 8/2016 | Marcella | G08G 5/025 |

OTHER PUBLICATIONS

Extended European Search Report for EP 18159183.5-1203/3382673, dated Sep. 5, 2018.

Pacciarelli et al: "Aircraft retiming and rerouting in vicinity of airports," IET Intelligent Transport Systems, vol. 6, No. 4, Dec. 1, 2012, pp. 433-443.

Smith et al: "Management of holding patterns: A potential ADS-B application," Digital Avionics Systems Conference, 2008, DASC 2008 IEEE/AIAA 27th, IEEE, Pscataway, NJ, USA, Oct. 26, 2008.

* cited by examiner

AIRCRAFT FLIGHT PATH HOLDING PATTERN SYSTEM AND METHOD

FIELD OF THE DISCLOSURE

Embodiments of the present disclosure generally relate to systems and methods for dynamically determining (for example, generating, calculating, adapting, and/or the like) holding patterns for aircraft.

BACKGROUND OF THE DISCLOSURE

Commercial aircraft are used to transport passengers between various locations. A commercial aircraft generally flies according to a predetermined flight plan between a departure airport and a destination airport. The flight plan includes a path from the departure airport to the destination airport, and may also include a flight time between the locations.

For various reasons, commercial, business, and general aviation aircraft may be diverted from a flight plan. For example, inclement weather may cause an air traffic controller to divert an aircraft from a flight plan. Due to inclement weather (such as rain or snow), visibility at a destination airport may be limited. Accordingly, an air traffic controller may then determine that separation times between landing aircraft need to be increased. As another example, flight congestion at a destination airport may also cause the air traffic controller to divert an aircraft from a flight plan into a holding pattern.

An aircraft may be diverted into a holding pattern, which deviates from the flight plan, in order to accommodate landing delays at a particular destination airport, whether due to inclement weather, flight congestion, and/or the like. Typically, an air traffic controller verbally communicates with a pilot onboard an aircraft to inform the pilot of a required landing delay, and directs the pilot to fly the aircraft in a specified holding pattern until further notice. The air traffic controller communicates the particulars of the holding pattern to the pilot, who then files the aircraft according to the holding pattern. Once the aircraft is diverted into the holding pattern, the pilot is typically unaware as to how long the holding pattern will last. As such, the pilot may periodically contact the air traffic controller to inquire as to when the aircraft will be cleared for landing.

A holding pattern is typically a fixed pattern over which an aircraft is flown. The holding pattern may include a route having multiple legs and turns, each of which provides a preset distance and time of flight. For example, a holding pattern may resemble a racetrack having two straight legs connected by two 180 degree turns. An aircraft in the holding pattern flies each preset leg and turn over a defined time period.

As can be appreciated, the aircraft consumes fuel as it flies from a current position within the holding pattern to an exit waypoint. Moreover, flying along a set holding pattern to a designated exit waypoint increases an overall time of flight.

SUMMARY OF THE DISCLOSURE

A need exists for a system and method for efficiently determining a holding pattern. A need exists for a system and method for updating a pilot of an aircraft regarding a holding pattern without the need for communicating with an air traffic controller. A need exists for a system and method for dynamically formulating a holding pattern that efficiently transitions an aircraft from the holding pattern to a landing approach.

With those needs in mind, certain embodiments of the present disclosure provide a flight path holding pattern system that is configured to generate (for example, determine, calculate, adapt, or the like) an efficient holding pattern for an aircraft. The flight path holding pattern system includes a holding pattern determination unit that is configured to automatically generate the holding pattern for the aircraft. The holding pattern determination unit automatically generate the holding pattern for the aircraft based on one or more of current air traffic in relation to a destination airport, historical holding patterns in relation to the destination airport, current weather conditions in relation to the destination airport, and fuel consumption of one or both of the aircraft and at least one other aircraft.

In at least one embodiment, the flight path holding pattern system includes a tracking sub-system that is configured to track the current air traffic in relation to the destination airport. The tracking sub-system outputs (for example, transmits) current air traffic data representative of the current air traffic to the holding pattern determination unit. The tracking sub-system may be an automatic dependent surveillance-broadcast (ADS-B) tracking sub-system.

In at least one embodiment, the flight path holding pattern system includes a historic holding pattern database in which historical holding pattern data representative of the historical holding patterns in relation to the destination airport is stored. The holding pattern determination unit is in communication with the historic holding pattern database.

In at least one embodiment, the flight path holding pattern system includes a weather determination sub-system that is configured to determine the current weather conditions in relation to the destination airport. The weather determination sub-system outputs weather data representative of the current weather conditions to the holding pattern determination unit.

The aircraft may output fuel consumption data representative of the fuel consumption to the holding pattern determination unit.

In at least one embodiment, the holding pattern determination unit determines (for example, generates, calculates, adapts, and/or the like) one or more of a shape, a duration, and an altitude of the holding pattern. Further, the holding pattern determination unit may determine a speed of the aircraft to fly within the holding pattern.

The holding pattern determination unit determines the holding pattern to efficiently transition the aircraft into a landing approach into the destination airport.

In at least one embodiment, the holding pattern determination unit varies one or both of a shape and altitude of the holding pattern. The holding pattern may include a plurality of altitudes.

In at least one embodiment, the holding pattern determination unit determines the holding pattern after a total time of the holding pattern is determined. The flight path holding pattern system may include a holding time prediction unit. The holding time prediction unit determines the total time of the holding pattern based on one or both of the current air traffic, the historical holding patterns, the current weather conditions, and the fuel consumption.

Certain embodiments of the present disclosure provide a flight path holding pattern method that includes automatically determining a holding pattern for an aircraft using a holding pattern determination unit based on one or more of current air traffic in relation to a destination airport, historical holding patterns in relation to the destination airport, current weather conditions in relation to the destination airport, and fuel consumption of one or both of the aircraft and at least one other aircraft.

DETAILED DESCRIPTION OF THE DISCLOSURE

Figure 1:
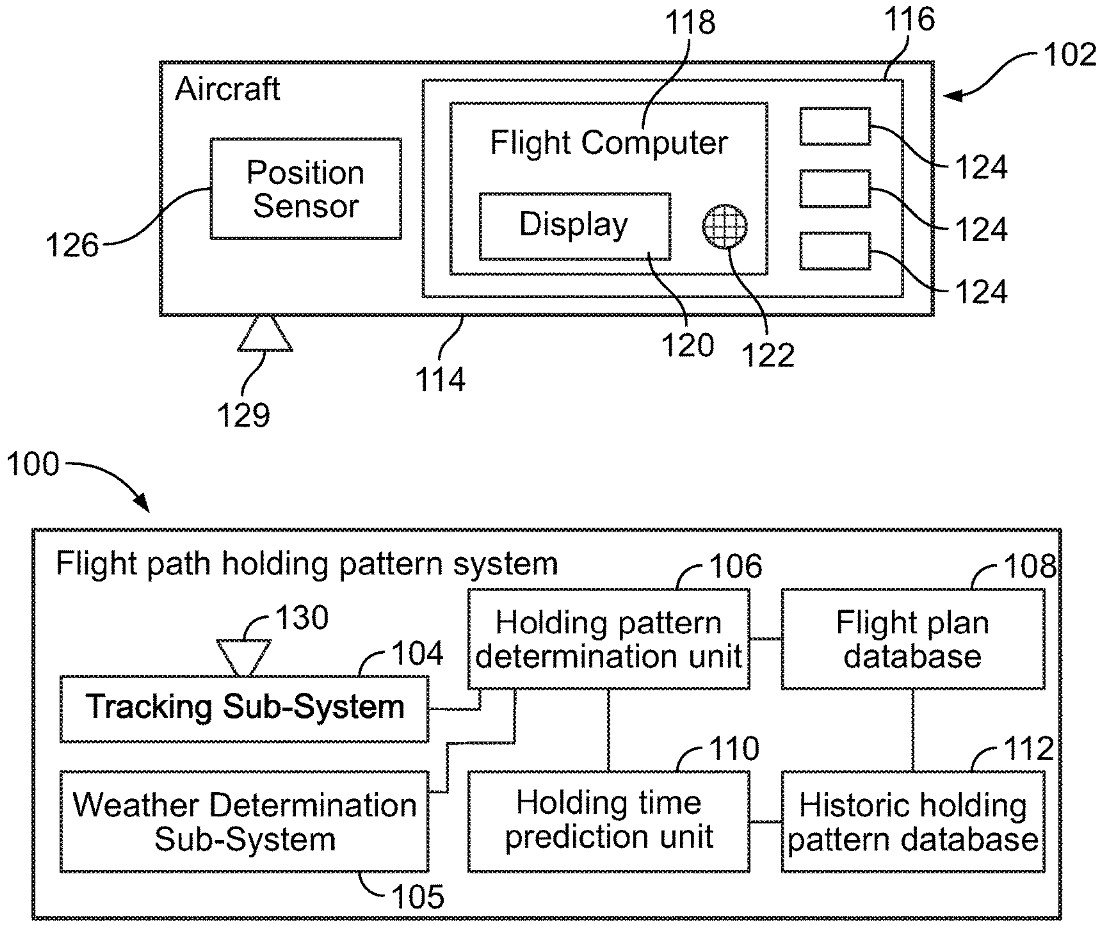
FIG. 1 is a schematic representation of a flight path holding pattern system in communication with an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a flight path holding pattern system that automatically and dynamically determines (for example, generates, calculates, adapts, and/or the like) holding patterns for aircraft. The flight path holding pattern system is configured to determine one or more of a shape of a holding pattern, a duration of a holding pattern, a speed of an aircraft flying within the holding pattern, and/or an altitude of the holding pattern in order to efficiently transition the aircraft from the holding pattern into an approach to landing at a destination airport.

In at least one embodiment, the flight path holding pattern system communicates with an aircraft to inform and update a pilot of a holding pattern without the need for the pilot to communicate with an air traffic controller.

Embodiments of the present disclosure provide flight path holding pattern systems and methods that increase situational awareness of aircraft operators, pilots, and/or passengers. For example, the flight path holding pattern systems and methods allow for real time updates of an arrival time for an aircraft, such as may be displayed on a flight computer within a cockpit, an inflight entertainment display within an internal cabin, and/or the like. Moreover, the flight path holding pattern systems and methods allow air traffic controllers to concentrate on other duties, due to there being a reduced need for voice communication with a pilot regarding a holding pattern.

Certain embodiments of the present disclosure provide systems and methods of dynamically determining holding patterns by utilizing flight tracking information, such as automatic dependent surveillance-broadcast (ADS-B) information, regarding air traffic proximate to an airport. The systems and methods utilize real time position information of an aircraft, such as from an ADS-B tracking system. The systems and methods system accurately predict aircraft arrival times as part of a coordinated air traffic management system for an airport.

Certain embodiments of the present disclosure provide a system and method that is configured to enhance the efficiency of holding patterns using historical information and current weather information combined with current air traffic information to dynamically create holding locations for aircraft proximate to a destination airport. The systems and methods use historical data and learning algorithms to develop and generate real time holding patterns that save fuel and improve airport throughput.

FIG. 1 is a schematic representation of a flight path holding pattern system (or holding pattern determination system) 100 in communication with an aircraft 102, according to an embodiment of the present disclosure. In at least one embodiment, the flight path holding pattern system 100 includes a tracking sub-system 104 that is configured to track a current position of the aircraft 102 and other aircraft proximate to a destination airport. In at least one embodiment, the flight path holding pattern system also includes a weather determination sub-system 105 that is configured to determine current weather conditions at and proximate to (such as within 150 miles or less of) the destination airport.

The flight path holding pattern system 100 includes a holding pattern determination unit 106 that is in communication with the tracking sub-system 104, such as through one or more wired or wireless connections. For example, the holding pattern determination unit 106 may wirelessly communicate with the tracking sub-system 104 through one or more transceivers, radio units, and/or the like. The holding pattern determination unit 106 is also in communication with a flight plan database 108 through one or more wired or wireless connections. Optionally, the flight path holding pattern system 100 may not include the flight plan database 108.

The holding pattern determination unit 106 is also in communication with the weather determination sub-system 105, such as through one or more wired or wireless connections. The weather determination sub-system 105 communicates the current weather at and proximate to one or more destination airports to the holding pattern determination unit 106. For example, the weather determination sub-system 105 may be a meteorological and weather service that is in communication with the holding pattern determination unit 106. In at least one other embodiment, the weather determination sub-system 105 may be an independent weather determination and forecasting system and/or service. For example, the weather determination sub-system 105 may include one or more Doppler radar installations.

The holding pattern determination unit 106 is also in communication with a holding time prediction unit 110 through one or more wired or wireless connections. The holding pattern determination unit 106 and the holding time prediction unit 110 are also in communication with a historic holding pattern database 112, such as through one or more wired or wireless connections.

The tracking sub-system 104, the weather determination sub-system 105, the holding pattern determination unit 106, the flight plan database 108, the holding time prediction unit 110, and the historic holding pattern database 112 may be at a common location, such as at a central monitoring center. In at least one embodiment, the tracking sub-system 104, the weather determination sub-system 105, the holding pattern determination unit 106, the flight plan database 108, the holding time prediction unit 110, and the historic pattern database 112 may be part of a single, common computing system at a common location. Optionally, the tracking sub-system 104 may be remotely located from the other components of the flight path holding pattern system 100. Also, optionally, the weather determination sub-system 105 may be remotely located from the other components of the flight path holding pattern system 100. Also, optionally, the holding pattern determination unit 106 and the holding time prediction unit 110 may be components of a single control or processing unit, and/or separate and distinct control and processing units. Further, the flight plan database 108 and the historic holding pattern database 112 may be distinct portions of a single memory, and/or separate and distinct memories, for example.

The aircraft 102 includes a main body or fuselage 114 that defines an internal cabin 116, which includes a cockpit and may also include a passenger seating area. A flight computer 118 within the internal cabin 116 includes a display 120 and/or a speaker 122. A plurality of passenger displays 124 (such as inflight entertainment displays) may be positioned within the internal cabin 116, such as on the rear of passenger seat headrests.

The aircraft 102 may also include a position sensor 126, such as a global positioning system sensor, an automatic depending surveillance-broadcast (ADS-B) sensor, and/or the like. The position sensor 126 outputs a signal indicative of one or more of the position, altitude, heading, acceleration, velocity, and/or the like of the aircraft 102. Alternatively, the aircraft 102 may not include the position sensor 126. The aircraft 102 also includes a communication device 129, such as a transceiver, radio unit, and/or the like, that allows the aircraft 102 to wirelessly communicate with a similar communication device 130 of the tracking sub-system 104.

The tracking sub-system 104 is configured to track a current position of the aircraft 102. In at least one embodiment, the tracking sub-system 104 is an ADS-B tracking sub-system. In such an embodiment, the ADS-B tracking sub-system 104 determines a current position of the aircraft via satellite navigation through a positional signal of the aircraft 102 output by the position sensor 126. The position sensor 126 may be or include a transmitter that periodically outputs information about the aircraft 102, such as identification details, current position, current altitude, and current velocity. The tracking sub-system 104 receives the transmitted position signal from the position sensor 126 to determine a current and real time position, heading, velocity, and the like of the aircraft 102. Alternatively, the tracking sub-system 104 may be a radar system or other such system that is configured to track the position of the aircraft.

As shown, the flight path holding pattern system 100 may be separate and distinct from the aircraft 102. For example, the flight path holding pattern system 100 may be located at a land-based monitoring center. In at least one other embodiment, the flight path holding pattern system 100 may be onboard the aircraft 102, another aircraft, watercraft, spacecraft (for example, a satellite), and/or the like.

In operation, the tracking sub-system 104 tracks the current position of the aircraft 102, such as through ADS-B signals and/or information. The holding pattern determination unit 106 is in communication with the tracking sub-system 104 and compares the current position of the aircraft 102 (as determined by the tracking sub-system 104) with a flight plan of the aircraft 102, as stored in the flight plan database 108. If the current position of the aircraft 102 is on or otherwise part of the stored flight plan of the aircraft 102 (within certain margins), then the holding pattern determination unit 106 determines that the aircraft 102 is flying according to the flight plan, and that the aircraft 102 is not in a holding pattern. If, however, the holding pattern determination unit 106 compares the current position of the aircraft 102 with the flight plan and determines that the aircraft is not at a location on or otherwise part of the stored flight plan (that is, it has deviated from the flight plan), then the holding pattern determination unit 106 determines that the aircraft 102 is in a holding pattern.

The flight path holding pattern system 100 may automatically generate when the aircraft 102 enters a holding pattern, such as through a comparison of the stored flight plan of the aircraft 102 and its current position, or the flight path holding pattern system 100 may be informed that the aircraft 102 is being diverted into a holding pattern. Upon determining that the aircraft 102 is to be diverted into a holding pattern, the holding pattern determination unit 106 automatically generates or otherwise formulates the holding pattern itself. For example, the holding pattern determination unit 106 determines one or more of a shape of the holding pattern, an altitude of the holding pattern, a time of flight within the holding pattern, and the like.

The holding pattern determination unit 106 analyzes historic holding patterns stored within the holding pattern database 112. The historic holding pattern database 112 stores historic data regarding holding patterns for aircraft with respect to a particular destination airport. For example, the historic holding pattern database 112 may store holding pattern data for flights landing at the destination airport for the current day, week, month, year, or more. Based on the historic holding patterns, the holding time prediction unit 110 predicts a time of the holding pattern for the aircraft 102. For example, based on data stored within the stored historic holding pattern database 112, the holding time prediction unit 110 may determine that the aircraft will be cleared to begin exit from the holding pattern and begin its approach to land at a certain period of time (such as ten minutes from the time the aircraft 102 diverted into the holding pattern).

The holding time prediction unit 110 also receives current air traffic information proximate to a destination airport from the tracking sub-system 104, which tracks all of the aircraft proximate (such as within 150 miles or less) to the airport. The holding time prediction unit 110 predicts the time of the holding pattern based on current air traffic in the vicinity of the airport, and historic holding pattern times stored in the historic holding pattern database 112.

Further, the holding time prediction unit 110 may be in communication with the tracking sub-system 104 to determine whether other flights are currently in a holding pattern in relation to the destination airport. Based on the number of flights currently in a holding pattern (and which may be in line to land before the aircraft 102), and the average duration of a holding pattern as determined from the holding pattern data stored in the historic holding pattern database 112, the holding time prediction unit 110 may then predict a duration of the holding pattern of the aircraft 102. Alternatively, the holding time prediction unit 110 may predict a duration of the holding pattern based on the number of aircraft scheduled to land before the aircraft 102, and/or the number of aircraft proximate to the destination airport that are in holding patterns (without use of historical data of previous flights).

In at least one embodiment, the holding time prediction unit 110 may determine that a typical (such as an average or mean) holding time for an aircraft with respect to the destination airport is ten minutes based on the holding pattern time data stored in the historic holding pattern database 112 in relation to a predetermined time period and/or predetermined similar weather conditions. As such, the holding time prediction unit 110 may then predict that the duration of the holding pattern of the aircraft 102 will be ten minutes from the time the aircraft 102 diverted from the flight plan, and then update a predicted landing time accordingly. The holding time prediction unit 110 may extend or shorten the predicted duration of the holding pattern based on the number of other flights scheduled to land before the aircraft 102 and/or those currently in holding patterns. For example, if there are no other flights currently in a holding pattern, the holding time prediction unit 110 may decrease the predicted duration of the holding pattern by a predetermined time (such as one or two minutes). Conversely, the holding time prediction unit 110 may extend the predicted duration of the holding time pattern by a predetermined time (such as one or two minutes) for each other aircraft within a holding pattern that is scheduled to land at the destination airport before the aircraft 102.

The holding time prediction unit 110 also adapts the predicted holding time based on current weather data, as received from the weather determination unit 105. For example, if current weather proximate to the airport results in reduced visibility (such as due to rain or snow), the holding time prediction unit 110 may increase the holding time, based on a preferred separation time between landing aircraft in such conditions.

The weather determination sub-system 105 may output various weather parameters to the holding pattern determination unit 106. The weather parameters may be analyzed by the flight path holding pattern system 100 to determine, at least in part, the holding pattern and time therefor. The weather parameters may include ceiling, dew point, temperature, visibility, wind gust, wind speed, and values for fog, rain, mist, snow, and thunderstorm.

Based on current air traffic, historic holding patterns, and/or current weather conditions, the holding time prediction unit 110 determines a holding time for the aircraft 102, such as through one or more algorithms, formulas, and/or the like. For example, the holding time prediction unit 110 may determine a predicted time for the holding pattern based on linear regression analysis, random forest analysis, ensemble methods, and/or the like.

In at least one other embodiment, instead of the holding time prediction unit 110 automatically predicting or otherwise determining the time of the holding pattern, the holding time may be input into the holding pattern determination unit 106. For example, an air traffic controller may input the time of the holding pattern for the aircraft 102 into the holding pattern determination unit 106. In at least one other embodiment, instead of a separate and distinct holding time prediction unit 110, the holding pattern determination unit 106 may be used to predict the holding time, based on current air traffic, historic holding pattern data stored within the historic holding pattern database 112, and/or current weather at and proximate to the destination airport, as output by the weather determination sub-system 105.

After the time of the holding pattern has been input into (or optionally determined by) the holding pattern determination unit 106 (whether through automatic input by the holding time prediction unit 110, or through manual input, such as by an air traffic controller), the holding pattern determination unit 106 determines one or more parameters of the holding pattern in order to efficiently transition the aircraft 102 from the holding pattern to an exit waypoint to a landing approach into the destination airport. In at least one embodiment, the holding pattern determination unit 106 determines a shape of the holding pattern based on the predicted time of the holding pattern. The holding pattern determination unit 106 determines a particular shape of the holding pattern to efficiently synchronize the aircraft 102 to be at an ideal exit waypoint from the holding pattern to a landing approach at the completion of the holding time (that is, the end time of the holding pattern). In at least one embodiment, the holding pattern determination unit 106 shapes the holding pattern so that the aircraft 102 flying at a particular speed and altitude, is at the exit waypoint as the holding time expires.

In at least one embodiment, the holding pattern determination unit 106 determines an average speed of the aircraft 102 within a holding pattern based the predicted time of the holding pattern. The holding pattern determination unit 106 determines an average speed of the aircraft 102 within the holding pattern to efficiently synchronize the aircraft 102 to be at the exit waypoint from the holding pattern at the end of the holding time. The holding pattern determination unit 106 determines one or both of the shape of the holding pattern and/or the speed of the aircraft 102 flying within the holding pattern so that the aircraft 102 is at the exit waypoint as the holding time expires.

In at least one embodiment, the holding pattern determination unit 106 determines an altitude of the holding pattern based the predicted time of the holding pattern. The holding pattern determination unit 106 determines the altitude of the holding pattern to efficiently synchronize the aircraft 102 to be at the exit waypoint from the holding pattern at the end of the holding time. The holding pattern determination unit 106 determines one or more of the shape of the holding pattern, the speed of the aircraft 102 flying within the holding pattern, and the altitude of the holding pattern so that the aircraft 102 is at the exit waypoint as the holding time expires.

The holding pattern determination unit 106 may vary the altitude of the holding pattern during the holding time. For example, the holding pattern determination unit 106 may determine that the aircraft 102 is to be at a first altitude at the beginning of the holding pattern, and a second altitude, which is lower than the first altitude, at the exit point of the holding pattern. The holding pattern determination unit 106 may determine the shape of the holding pattern to change altitudes at certain set periods of the holding pattern. For example, the holding pattern determination unit 106 may determine altitudes and transitions therebetween of the holding pattern at particular time periods of the holding pattern. In at least one embodiment, the holding pattern determination unit 106 may shape the holding pattern to gradually change from a first altitude to a second altitude over time, forming a spiral shaped holding pattern centered about a particular point proximate to the airport. By varying the altitude of the holding pattern from an initial high altitude to a later low altitude, the aircraft 102 conserves fuel, as an aircraft flying at a higher altitude consumes less fuel than at a lower altitude (due to there being less air pressure and resistance at the higher altitude).

In at least one embodiment, the holding pattern may include a high altitude, and a steep descent towards an exit point from the holding pattern. However, such a steep descent may be unsettling to certain passengers. As such, the holding pattern may include an initial high altitude that gradually spirals down to the exit point from the holding pattern.

In at least one embodiment, the flight path holding pattern system 100 determines the holding time and pattern based on one or more of holding pattern shape, holding pattern altitude, aircraft speed within the holding pattern, and weather conditions (for example, to avoid areas of inclement weather) to efficiently transition the aircraft 102 within the holding pattern to the exit point from the holding pattern to an approach sequence to landing at the destination airport. The flight path holding pattern system 100 may output the holding pattern to the flight computer 118 of the aircraft 102. The aircraft 102 may automatically fly according to the holding pattern received from the flight path holding pattern system 100. Optionally, a pilot operating the aircraft 102 may operate the aircraft 102 according to the holding pattern received from the flight path holding pattern system 100.

In at least one embodiment, the flight path holding pattern system 100 may determine holding patterns and times based on linear regression analysis, random forest analysis, ensemble methods, and/or the like, so as to develop models for holding patterns. The holding pattern determination unit 106 may develop the models, and regularly update the models (such as once a day, week, month, or the like) in order to adapt to changing conditions.

The flight path holding pattern system 100 may determine a holding pattern for aircraft based on the following considerations:

$$\left[\begin{bmatrix}\begin{pmatrix}\text{altitude}\\ \text{ave speed}\\ \text{duration}\\ \text{position}\\ WX_{params}\end{pmatrix}_1 & \cdots & \begin{pmatrix}\text{altitude}\\ \text{ave speed}\\ \text{duration}\\ \text{position}\\ WX_{params}\end{pmatrix}_m\end{bmatrix}^n_{holdings}\right] \rightarrow$$

$$[\text{fuel burn} \ldots \text{fuel burn}]_{actual}$$

$$[\text{fuel burn} \ldots \text{fuel burn}]_{estimated}$$

The flight path holding pattern system 100 may determine the holding pattern(s) based on various parameters, including aircraft altitude within a holding pattern, average speed of the aircraft, duration of the aircraft, positions of the aircraft at various time periods of the holding pattern, weather conditions ($WX_{params}$) in order to conserve fuel consumption of the aircraft. For example, the various parameters are analyzed by the flight path holding pattern system 100 in relation to historical fuel burn computations and mapping functions. By aggregating (m) flights in relation to (n) destinations (as shown in the square matrices), the flight path holding pattern system may determine actual fuel consumption for various aircraft, and estimate fuel burn for aircraft within the holding patterns. In this manner, the flight path holding pattern system 100 may analyze the various parameters to generate a holding pattern (including a time thereof) for each aircraft 102 to conserve as much fuel as possible.

In at least one embodiment, the flight path holding pattern system may analyze a weighted set of current and historical holding parameters (such as altitude, average speed, duration, position, weather, and the like) and determine a holding pattern and time with minimal fuel burn using the following equation:

$$\min[w_1{*}(\text{historical altitude}-\text{current altitude})+w_2{*}(\text{historical ave speed}-\text{current speed})+\ldots+w_k(\text{historical }WX-\text{current }WX)+W{*}\text{historical\_fuel\_burn}]_m$$

in which W's represent predetermined weightings, WX represents weather conditions, historical ave speed is the average speed of aircraft that have previously flown in holding patterns proximate to the airport over a predetermined time period, current speed is the current speed of the aircraft in a holding pattern, and historical fuel burn is historical data regarding fuel burned by previous aircraft flying in holding patterns proximate to the airport.

The flight path holding pattern system 100 may be in communication with air traffic control at a destination airport to determine altitudes at which holding patterns are currently set. The flight path holding pattern system 100 may also determine the waypoints (for example, exits from holding patterns) that are currently being used by air traffic control. The pilot of the aircraft 102 may contact air traffic control to ask if the aircraft 102 can fly at a certain altitude, speed, and waypoint that is a preferred option. In general, the flight path holding pattern system 100 may be configured to determine a best combination of altitude and speed in a holding pattern that burns the least amount of fuel, as described above.

In at least one embodiment, the flight path holding pattern system 100 may be configured to hold proximate to a closest waypoint to conserve an amount of "bug out" fuel, which is an amount of fuel needed to get from a particular point (location) to another destination. In short, bug out fuel is reserve fuel that the aircraft needs to divert from a location to a current destination airport to another airport.

In at least one embodiment, as described above, the flight path holding pattern system 100 is configured to determine holding patterns for aircraft proximate to an airport based, at least in part, on minimal consumption of fuel by the aircraft. That is, the flight path holding pattern system 100 may determine a holding pattern for an aircraft to ensure that a lowest amount of fuel is consumed by the aircraft.

After the flight path holding pattern system 100 determines the holding pattern for the aircraft 102, the flight path holding pattern system 100 may output a holding pattern signal to the aircraft 102. The holding pattern signal is received by the aircraft 102. The flight computer 118 may display the holding pattern on the display 120 (such as via text, graphics, or video) to a pilot of the aircraft 102. Optionally, the flight computer 118 may broadcast the holding pattern to the pilot through the speaker 122. Further, the holding pattern may be output to the passenger displays 124 in order to keep passengers apprised of the position of the aircraft 102 and duration of the holding pattern and/or a predicted time of landing.

As shown in FIG. 1, the flight path holding pattern system 100 is configured to track a current position of the aircraft 102 and determine the holding pattern for the aircraft 102 in order to efficiently transition the aircraft 102 out of the holding pattern into a landing approach. While only one aircraft 102 is shown in FIG. 1, it is to be understood that the flight path holding pattern system 100 is also configured to track current positions of multiple aircraft, and determine holding patterns for the multiple aircraft.

The flight path holding pattern system 100 determines one or more parameters of a holding pattern for aircraft based on historical holding pattern data stored in the historic holding pattern database 112, current air traffic proximate to the destination airport as detected by the tracking sub-system 104, current weather conditions proximate to the destination airport as detected by the weather determination sub-system 105, and/or fuel consumption considerations for the aircraft 102.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the holding pattern determination unit 106 and the holding time prediction unit 110 may be or include one or more processors that are configured to control operation of the flight path holding pattern system 100, as described above. As indicated, the holding determination unit 106 and the flight path holding pattern system 100 may be separate and distinct control units, or may be part of the same control unit.

The holding pattern determination unit 106 and the holding time prediction unit 110 are configured to execute a set of instructions that are stored in one or more data storage units or elements (such as one or more memories), in order to process data. For example, the holding pattern determination unit 106 and the holding time prediction unit 110 may include or be coupled to one or more memories. The data storage units may also store data or other information as desired or needed. The data storage units may be in the form of an information source or a physical memory element within a processing machine.

The set of instructions may include various commands that instruct the holding pattern determination unit 106 and the holding time prediction unit 110 as processing machines to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the holding pattern determination unit 106 and the holding time prediction unit 110. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the holding pattern determination unit 106 and the holding time prediction unit 110 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
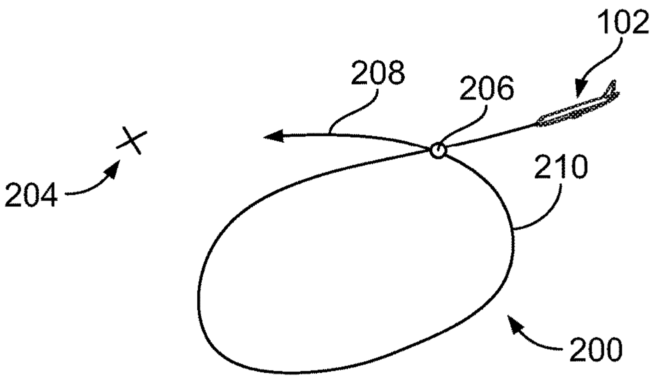
FIG. 2 is a simplified diagrammatic representation of a top view of a holding pattern for an aircraft in relation to a destination airport, according to an embodiment of the present disclosure.

FIG. 2 is a simplified diagrammatic representation of a top view of a holding pattern 200 for an aircraft 102 in relation to a destination airport 204, according to an embodiment of the present disclosure. Referring to FIGS. 1 and 2, the flight path holding pattern system 100 determines the shape of the holding pattern 200 based on various parameters including a predicted holding time, a speed of the aircraft 102, an altitude of the aircraft 102, weather conditions proximate to the airport 204, fuel consumption considerations for the aircraft 102, and/or the like. The aircraft 102 enters the holding pattern at waypoint 206, such as an entrance to the holding pattern 200. The holding patterns may be shaped or sized in any manner to efficiently and safely transition the aircraft 102 to an approach 208 to the airport 204. The exit waypoint may be at the same location as the entrance waypoint 206. Optionally, the exit waypoint may differ from the entrance waypoint 206.

The holding pattern 200 may include a single loop 210 or path between the entrance waypoint 206 and the exit waypoint, as shown in FIG. 2. Optionally, the holding pattern 200 may include multiple loops or paths between the entrance and exit waypoints.

The holding pattern 200 between the entrance waypoint 206 and the exit waypoint (the same as the entrance waypoint 206, as shown in FIG. 2) may be at the same altitude. Optionally, the holding pattern 200 may include different altitudes.

The flight path holding pattern system 100 dynamically determines an optimal holding pattern 200 based on a predicted time for holding, current air traffic proximate (such as within 100 miles) of the destination airport 204 as determined by the tracking sub-system 104, and weather conditions as detected by the weather determination sub-system 105. The flight path holding pattern system 100 may also analyze fuel consumption of the aircraft 102 and determine the holding pattern 200 based on fuel consumption considerations (such as minimizing or otherwise reducing fuel consumption).

In at least one embodiment, the flight path holding pattern system 100 determines the holding pattern so that the aircraft 102 is at the exit waypoint as the holding time ends. In this manner, the aircraft 102 seamlessly transitions from the exit waypoint into the approach 208, instead of continuing to fly in the holding pattern and/or flying from a distal point in the holding pattern 200 to the exit waypoint. Therefore, the aircraft 102 consumes less fuel, and the total flight time is reduced.

Figure 3:
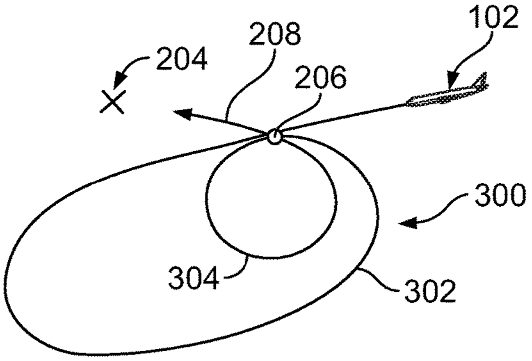
FIG. 3 is a simplified diagrammatic representation of a top view of a holding pattern for an aircraft in relation to a destination airport, according to an embodiment of the present disclosure.

FIG. 3 is a simplified diagrammatic representation of a top view of a holding pattern 300 for an aircraft 102 in relation to a destination airport 204, according to an embodiment of the present disclosure. Referring to FIGS. 1 and 3, the flight path holding pattern system 100 may create the holding pattern 300 having multiple loops 302 and 304. The outer loop 302 is larger than the inner loop 304. Again, the flight path holding pattern system 100 determines the shape of the holding pattern 300 based on various parameters including a predicted holding time, a speed of the aircraft 102, an altitude of the aircraft 102, weather conditions proximate to the airport 204, fuel consumption considerations for the aircraft 102, and/or the like.

The holding pattern 300 may include more loops or paths than shown. For example, the holding pattern 300 may include three or more loops, each of which may differ in size and shape.

The holding pattern 300 between the entrance waypoint 206 and the exit waypoint (the same as the entrance waypoint 206, as shown in FIG. 3) may be at a single altitude. Optionally, the holding pattern 300 may include different altitudes. For example, the loop 302 may be at a higher altitude than that of the loop 304 (or vice versa). Again, the aircraft 102 seamlessly transitions from the exit waypoint into the approach 208.

Figure 4:
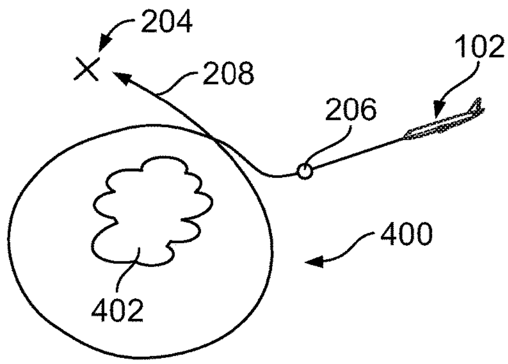
FIG. 4 is a simplified diagrammatic representation of a top view of a holding pattern for an aircraft in relation to a destination airport, according to an embodiment of the present disclosure.
Figure 5:
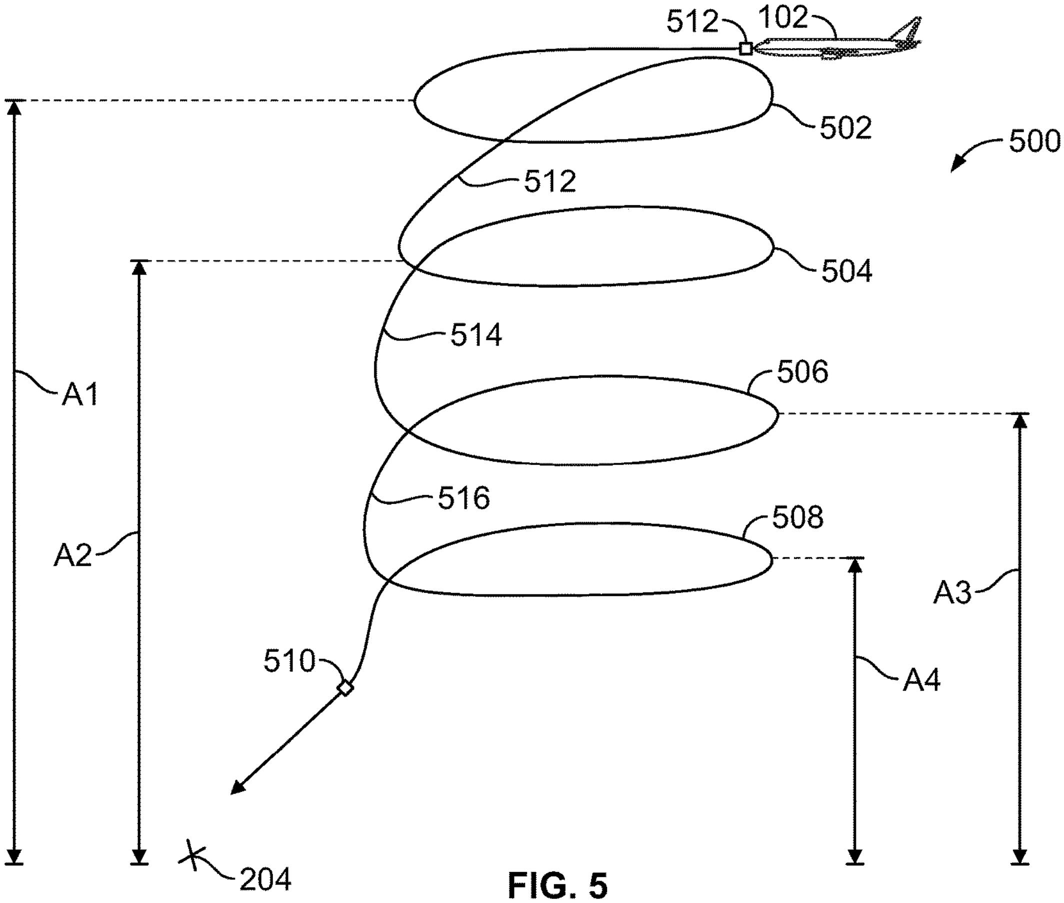
FIG. 5 is a simplified diagrammatic representation of a lateral view of a holding pattern for an aircraft in relation to a destination airport, according to an embodiment of the present disclosure.

FIG. 4 is a simplified diagrammatic representation of a top view of a holding pattern 400 for an aircraft 102 in relation to the destination airport 204, according to an embodiment of the present disclosure. Referring to FIGS. 1 and 4, the flight path holding pattern system 100 determines a shape of the holding pattern 400 to avoid an area of inclement weather 402. Again, the aircraft 102 seamlessly transitions from the exit waypoint into the approach 208, FIG. 5 is a simplified diagrammatic representation of a lateral view of a holding pattern 500 for an aircraft 102 in relation to a destination airport 204, according to an embodiment of the present disclosure. Referring to FIGS. 1 and 5, the flight path holding pattern system 100 determines the holding pattern 500 having a plurality of altitude loops 502, 504, 506, and 508. The altitude loop 502 is at a first altitude A1. The altitude loop 504 is at a second altitude A2 that is lower than A1. The altitude loop 506 is at a third altitude A3 that is lower than A2. The altitude loop 508 is at a fourth altitude A4 that is lower than A3. The aircraft 102 may maintain the particular altitude within each loop 502, 504, 506, and 508. The holding pattern 500 may include more or less altitude loops than shown. As shown, the holding pattern 500 may include a descent 512 connecting the loops 502 and 504, a descent 514 connecting the loops 504 and 506, and a descent 516 connecting the loops 506 and 508. Each loop 502, 504, 506, and 508 may be sized and shaped the same. Optionally, at least two of the loops 502, 504, 506, and 508 may differ in one or both of size and shape.

Multiple aircraft may be diverted into the holding pattern 500 at the same time. For example, an aircraft proximate to an exit waypoint 510 may be within the lowest loop 508, while an aircraft that enters the entrance waypoint 512 may be at the highest loop 502. Multiple aircraft 102 may be directed into and out of the holding pattern 500, as determined by the flight path holding pattern system 100, based on (for example) a predetermined separation time, which may be based on landing considerations, weather, and the like. For example, at any one time, at least two or more aircraft may be within the holding pattern 500. Each aircraft may be separated by a predetermined spacing along the holding pattern, such that different aircraft pass through a particular point within the holding pattern at predetermined time intervals (such as 3 minutes, or longer or shorter depending on weather considerations, for example). Multiple aircraft may be directed into and out of any of the holding patterns of any of the examples of present disclosure.

Figure 6:
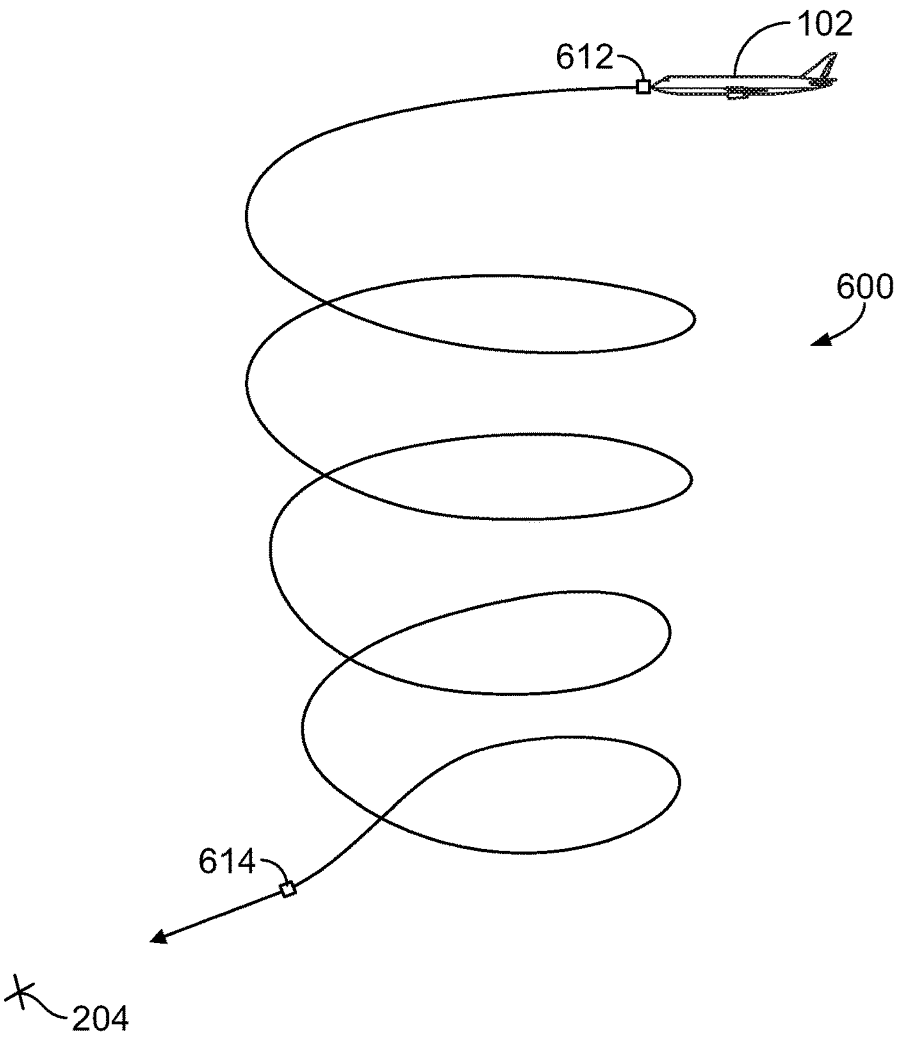
FIG. 6 is a simplified diagrammatic representation of a lateral view of a holding pattern for an aircraft in relation to a destination airport, according to an embodiment of the present disclosure.

FIG. 6 is a simplified diagrammatic representation of a lateral view of a holding pattern 600 for an aircraft 102 in relation to a destination airport 204, according to an embodiment of the present disclosure. The holding pattern 600 is similar to the holding pattern 500, except that the holding pattern 600 includes a gradually descending spiral between an entrance waypoint 612 and an exit waypoint 614. The holding pattern 600 continually descends from the entrance waypoint 612 to the exit waypoint 614 instead of maintaining a particular altitude.

Figure 7:
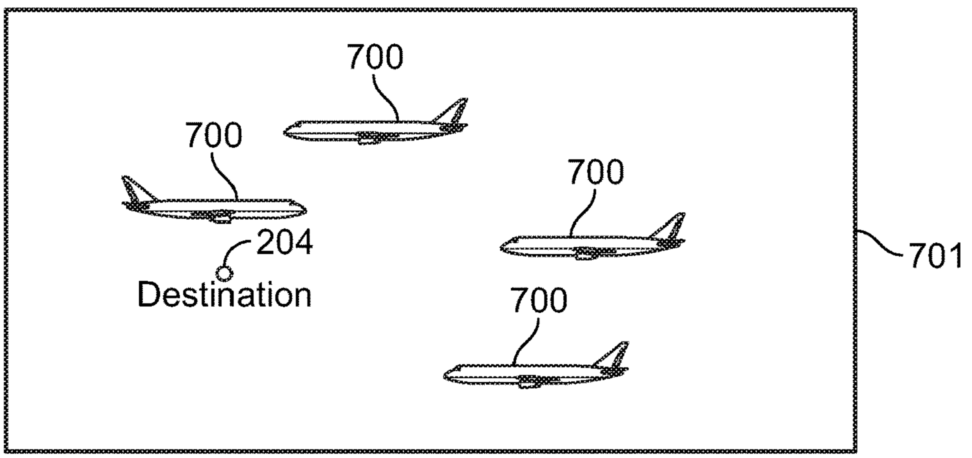
FIG. 7 is a diagrammatic representation of a front view of a display showing indicia of a plurality of aircraft proximate to a destination airport, according to an embodiment of the present disclosure.

FIG. 7 is a diagrammatic representation of a front view of a display 701 showing indicia 700 of a plurality of aircraft proximate to a destination airport 204, according to an embodiment of the present disclosure. Referring to FIGS. 1 and 7, the flight path holding pattern system 100 is configured to track multiple aircraft, as shown by the indicia 700, and determine holding patterns for each of the aircraft.

In at least one embodiment, the holding pattern determination unit 106 may be configured to detect a holding pattern for one or more aircraft that are proximate to the destination airport 204. For example, the holding pattern determination unit 106 may be configured to detect holding patterns for aircraft within a predefined range of the destination airport 204. The predefined range may be one hundred miles. Optionally, the predetermined range may be less than one hundred miles (such as fifty miles), or greater than one hundred miles (such as two hundred miles).

Figure 8:
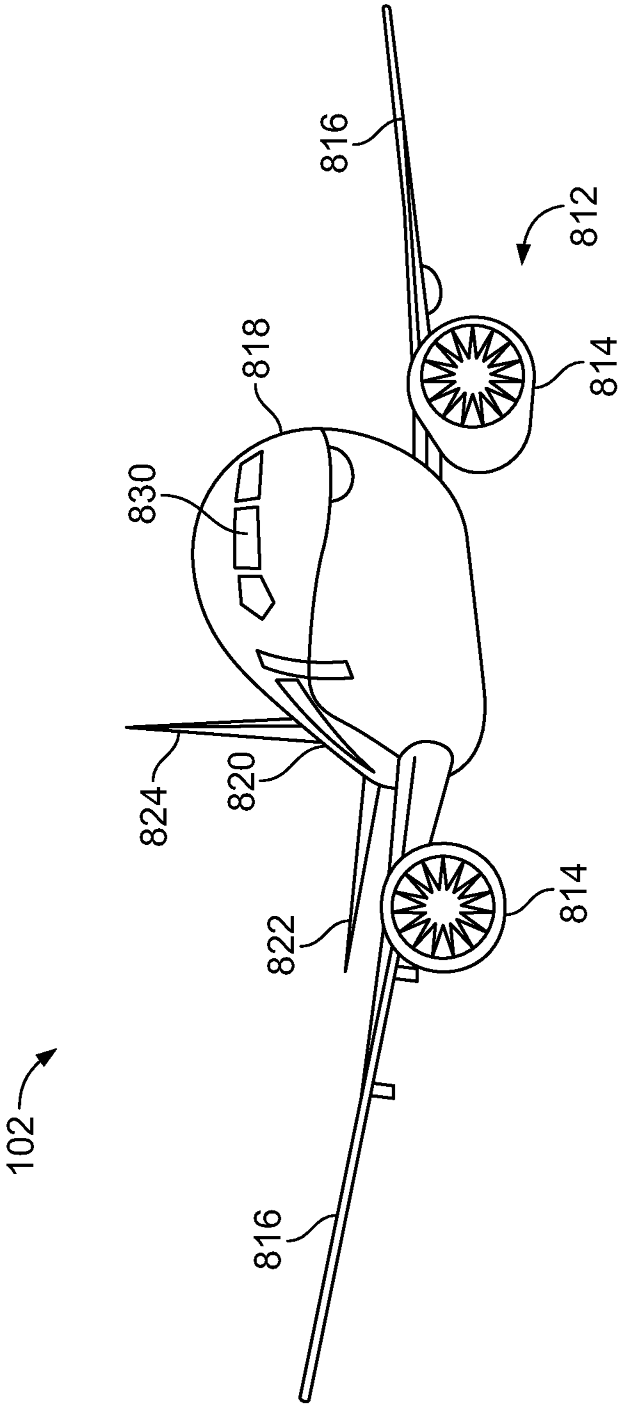
FIG. 8 is a diagrammatic representation of a front perspective view of an aircraft, according to an embodiment of the present disclosure.

FIG. 8 is a diagrammatic representation of a front perspective view of the aircraft 102, according to an embodiment of the present disclosure. The aircraft 102 includes a propulsion system 812 that may include two turbofan engines 814, for example. Optionally, the propulsion system 812 may include more engines 814 than shown. The engines 814 are carried by wings 816 of the aircraft 102. In other embodiments, the engines 814 may be carried by a fuselage 818 and/or an empennage 820. The empennage 820 may also support horizontal stabilizers 822 and a vertical stabilizer 824. The fuselage 818 of the aircraft 102 defines an internal cabin, which may include a cockpit 830, one or more work sections (for example, galleys, personnel carry-on baggage areas, and the like), one or more passenger sections (for example, first class, business class, and coach sections), and an aft section in which an aft rest area assembly may be positioned.

Figure 9:
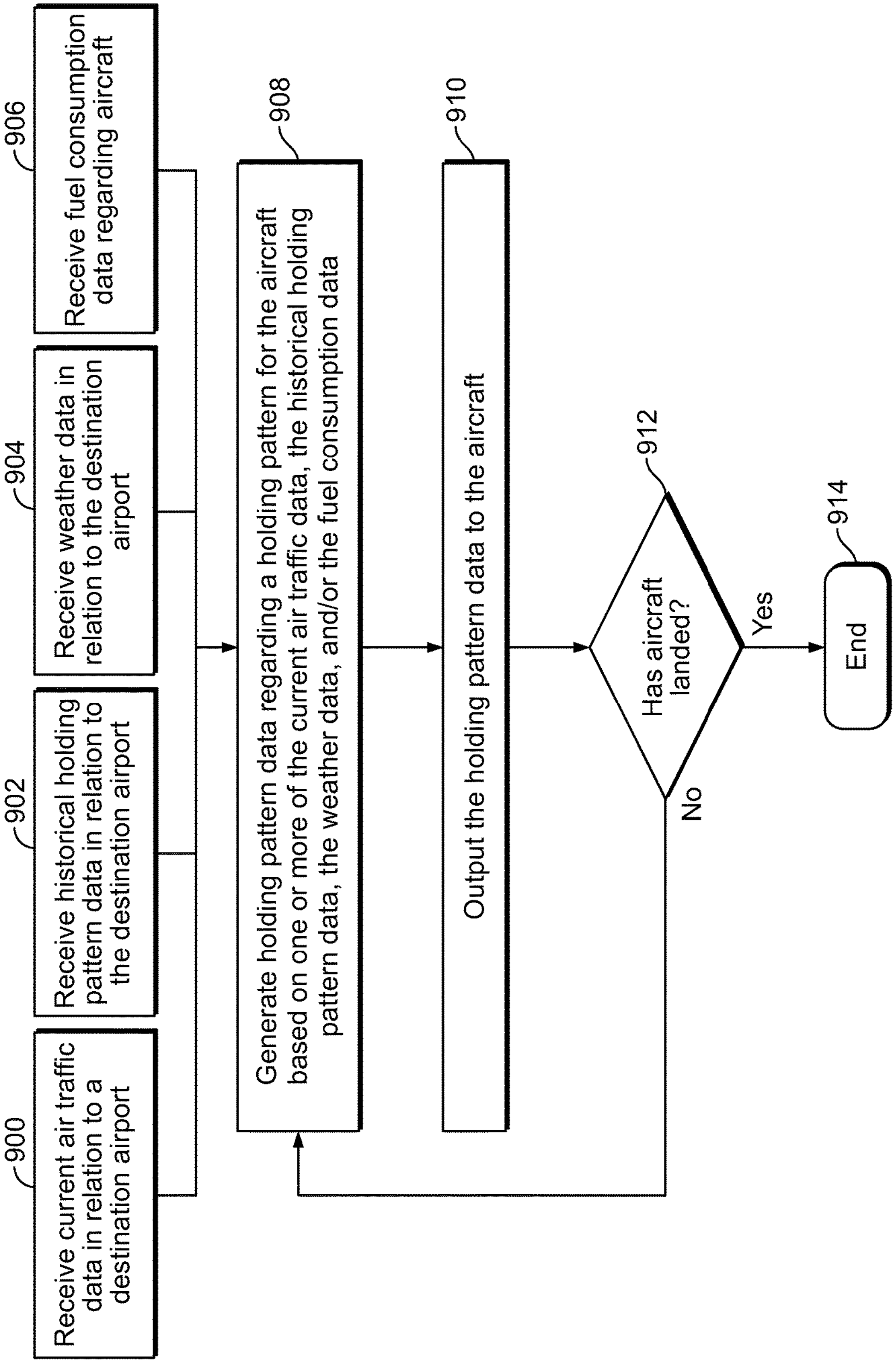
FIG. 9 illustrates a flow chart of a method of determining a holding pattern for an aircraft, according to an embodiment of the present disclosure.

FIG. 9 illustrates a flow chart of a method of determining a holding pattern for an aircraft, according to an embodiment of the present disclosure. Referring to FIGS. 1 and 9, at 900, the holding pattern determination unit 106 receives current air traffic data in relation to a destination airport. The current air traffic control data is representative of current air traffic (including incoming and outgoing flights) proximate to the destination airport. In at least one embodiment, the holding pattern determination unit 100 receives the current air traffic control data from the tracking sub-system 104.

At 902, the holding pattern determination unit 106 receives historical holding pattern data in relation to the destination airport. The historical holding pattern data is representative of previous holding patterns (including holding times) for aircraft in relation to the destination airport over a predetermined time period (such as one week, one month, one year, or the like). The historical holding pattern data may be stored in the historic holding pattern database 112. In at least one embodiment, the historical holding pattern data may be stored in the holding pattern determination unit 106.

At 904, the holding pattern determination unit 106 receives weather data in relation to the destination airport. The weather data is representative of weather proximate to the destination airport (such as within an area in which holding patterns may occur). In at least one embodiment, the holding pattern determination unit receives the weather data from the weather determination sub-system 105.

At 906, the holding pattern determination unit 106 receives fuel consumption data regarding the aircraft. The fuel consumption data is representative of actual fuel consumed by the aircraft, fuel efficiency performance of the aircraft, estimated fuel consumption based on previous performance of the aircraft or one or more other aircraft, and the like. The fuel consumption data may be received from the aircraft 102, a fuel consumption database of the aircraft 102, and/or a separate and distinct fuel consumption database.

Alternatively, the method may include at least one of, but not all of, 900, 902, 904, and 906. For example, the holding pattern determination unit 106 may receive just the air traffic data and the historical holding pattern data.

At 908, the holding pattern determination unit 106 generates holding pattern data regarding a holding pattern (including a shape of a holding pattern and a holding time of the holding pattern) for the aircraft based on one or more of the current air traffic data, the historical holding pattern data, the weather data, and/or the fuel consumption data. The holding pattern data may include instructions for aircraft speed and altitude, for example. At 910, the holding pattern determination unit outputs the holding pattern data to the aircraft 102. A pilot of the aircraft 102 may fly the aircraft 102 according to the holding pattern, as defined by the holding pattern data. In at least one other embodiment, the flight computer 118 of the aircraft 102 may receive the holding pattern data, and automatically fly the aircraft 102 according to the holding pattern data.

At 912, the holding pattern determination unit 106 determines whether the aircraft 102 has landed or entered a landing approach (for example, after following the prescribed holding pattern). If not, the method returns to 908, at which the holding pattern determination unit 106 may adapt the holding pattern data based on changing parameters, such as changing current air traffic or weather. If, however, the aircraft 102 has landed (or otherwise exited from the holding pattern into a landing approach), the method ends at 914 for the aircraft, and the process repeats for other aircraft proximate to the destination airport.

Referring to FIGS. 1-9, embodiments of the present disclosure provide systems and methods that allow large amounts of data to be quickly and efficiently analyzed by a computing device. For example, numerous aircraft may be proximate to a destination airport, each of which is scheduled to land. As such, large amounts of data are being tracked and analyzed. The vast amounts of data are efficiently organized and/or analyzed by the flight path holding pattern system 100, as described above. The flight path holding pattern system 100 analyzes the data in a relatively short time in order to quickly and efficiently output holding time predictions for the various aircraft within the vicinity of the destination airport. For example, the flight path holding pattern system 100 analyzes current flight data and outputs holding patterns for the various aircraft in real time. A human being would be incapable of efficiently analyzing such vast amounts of data in such a short time. As such, embodiments of the present disclosure provide increased and efficient functionality with respect to prior computing systems, and vastly superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

As described above, embodiments of the present disclosure provide flight path holding pattern systems and methods that are configured to determine a holding pattern for an aircraft. The flight path holding pattern systems and methods automatically and dynamically create the holding pattern based on one or more of historical holding pattern information, current air traffic in relation to a destination airport, current weather conditions, and/or fuel consumption considerations of the aircraft. The flight path holding pattern systems and methods may instruct an aircraft to alter one or both of speed or altitude within a holding pattern in order to efficiently transition the aircraft out of the holding pattern.

Embodiments of the present disclosure provide systems and methods for efficiently determining a holding pattern. Embodiments of the present disclosure provide systems and methods for updating a pilot of an aircraft regarding a holding pattern without the need for communicating with an air traffic controller. Embodiments of the present disclosure provide systems and methods for dynamically formulating a holding pattern that efficiently transitions an aircraft from the holding pattern to landing approach.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim 1imitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A flight path holding pattern system that is configured to generate an efficient holding pattern for an aircraft, the flight path holding pattern system comprising:

a holding pattern determination unit that is configured to automatically generate the holding pattern for the aircraft, wherein the holding pattern determination unit automatically generates the holding pattern for the aircraft based on current air traffic in relation to a destination airport, historical holding patterns in relation to the destination airport, current weather conditions in relation to the destination airport, and fuel consumption of one or both of the aircraft and at least one other aircraft.

2. The flight path holding pattern system of claim 1, further comprising a tracking sub-system that is configured to track the current air traffic in relation to the destination airport, wherein the tracking sub-system transmits current air traffic data representative of the current air traffic to the holding pattern determination unit.

3. The flight path holding pattern system of claim 2, wherein the tracking sub-system comprises an automatic dependent surveillance-broadcast (ADS-B) tracking sub-system.

4. The flight path holding pattern system of claim 1, further comprising a historic holding pattern database that stores historical holding pattern data representative of the historical holding patterns in relation to the destination airport, wherein the holding pattern determination unit is in communication with the historic holding pattern database.

5. The flight path holding pattern system of claim 1, further comprising a weather determination sub-system that is configured to determine the current weather conditions in relation to the destination airport, wherein the weather determination sub-system outputs weather data representative of the current weather conditions to the holding pattern determination unit.

6. The flight path holding pattern system of claim 1, wherein the aircraft outputs fuel consumption data representative of the fuel consumption to the holding pattern determination unit.

7. The flight path holding pattern system of claim 1, wherein the holding pattern determination unit determines one or more of a shape, a duration, and an altitude of the holding pattern.

8. The flight path holding pattern system of claim 1, wherein the holding pattern determination unit determines a speed of the aircraft to fly within the holding pattern.

9. The flight path holding pattern system of claim 1, wherein the holding pattern determination unit determines the holding pattern to efficiently transition the aircraft into a landing approach into the destination airport.

10. The flight path holding pattern system of claim 1, wherein the holding pattern determination unit varies one or both of a shape and altitude of the holding pattern.

11. The flight path holding pattern system of claim 1, wherein the holding pattern comprises a plurality of altitudes.

12. The flight path holding pattern system of claim 1, wherein the holding pattern determination unit generates the holding pattern after a total time of the holding pattern is determined.

13. The flight path holding pattern system of claim 12, further comprising a holding time prediction unit, wherein the holding time prediction unit determines the total time of the holding pattern based on one or both of the current air traffic, the historical holding patterns, the current weather conditions, and the fuel consumption.

14. A flight path holding pattern method, comprising:

automatically generating a holding pattern for an aircraft using a holding pattern determination unit based on current air traffic in relation to a destination airport, historical holding patterns in relation to the destination airport, current weather conditions in relation to the destination airport, and fuel consumption of one or both of the aircraft and at least one other aircraft.

15. The flight path holding pattern method of claim 14, further comprising:

tracking the current air traffic in relation to the destination airport using a tracking sub-system;

transmitting current air traffic data representative of the current air traffic from the tracking sub-system to the holding pattern determination unit.

16. The flight path holding pattern method of claim 14, further comprising storing historical holding pattern data representative of the historical holding patterns in relation to the destination airport in a historic holding pattern database that is communicatively coupled to the holding pattern determination unit.

17. The flight path holding pattern method of claim 14, further comprising:

determining the current weather conditions in relation to the destination airport using a weather determination sub-system, wherein the weather determination sub-system; and outputting weather data representative of the current weather conditions from the weather determination sub-system to the holding pattern determination unit.

18. The flight path holding pattern method of claim 14, further comprising outputting fuel consumption data representative of the fuel consumption from the aircraft to the holding pattern determination unit.

19. The flight path holding pattern method of claim 14, wherein the automatically determining comprises determining a shape, a duration, and an altitude of the holding pattern.

20. The flight path holding pattern method of claim 14, wherein the automatically determining comprises determining a speed of the aircraft to fly within the holding pattern.

21. The flight path holding pattern method of claim 14, wherein the automatically determining comprises varying one or both of a shape and altitude of the holding pattern.

22. The flight path holding pattern method of claim 14, wherein the automatically determining comprises determining a plurality of altitudes for the holding pattern.

23. The flight path holding pattern method of claim 14, further comprising determining a total time of the holding pattern, wherein the automatically determining occurs after the determining a total time.

24. The flight path holding pattern method of claim 23, further comprising using a holding time prediction unit to determine the total time of the holding pattern based on one or both of the current air traffic, the historical holding patterns, the current weather conditions, and the fuel consumption.

25. A flight path holding pattern system, comprising:

a holding pattern determination unit that is configured to automatically generate a holding pattern for an aircraft;

an automatic dependent surveillance-broadcast (ADS-B) tracking sub-system that is configured to track current air traffic in relation to a destination airport, wherein the ADS-B tracking sub-system outputs current air traffic data representative of the current air traffic to the holding pattern determination unit;

a historic holding pattern database that stores historical holding pattern data representative of historical holding patterns in relation to the destination airport, wherein the holding pattern determination unit is in communication with the historic holding pattern database; and a weather determination sub-system that is configured to determine current weather conditions in relation to the destination airport, wherein the weather determination sub-system outputs weather data representative of the current weather conditions to the holding pattern determination unit, wherein the holding pattern determination unit automatically generates the holding pattern for the aircraft based on the current air traffic in relation to the destination airport, the historical holding patterns in relation to the destination airport, the current weather conditions in relation to the destination airport, and fuel consumption of one or both of the aircraft and at least one other aircraft, wherein the holding pattern determination unit determines a shape, a duration, and an altitude of the holding pattern, wherein the holding pattern determination unit determines a speed of the aircraft to fly within the holding pattern, wherein the holding pattern determination unit determines the holding pattern to efficiently transition the aircraft into a landing approach into the destination airport.

26. The flight path holding pattern system of claim 25, wherein the holding pattern determination unit varies one or both of a shape and altitude of the holding pattern.

27. The flight path holding pattern system of claim 25, wherein the holding pattern comprises a plurality of altitudes.

28. The flight path holding pattern system of claim 25, further comprising a holding time prediction unit, wherein the holding time prediction unit determines a total time of the holding pattern based on one or both of the current air traffic, the historical holding patterns, the current weather conditions, and the fuel consumption.

* * * * *